United States Patent [19]
Maly

[11] Patent Number: 5,669,662
[45] Date of Patent: Sep. 23, 1997

[54] AIRBAG DEPLOYMENT PAD

[75] Inventor: Timothy M. Maly, Plymouth, Mich.

[73] Assignee: Morton International, Inc., Chicago, Ill.

[21] Appl. No.: 742,857

[22] Filed: Nov. 1, 1996

[51] Int. Cl.$^6$ ............................................. B60N 2/42
[52] U.S. Cl. ........................ 297/216.13; 297/DIG. 3
[58] Field of Search .................. 297/216.1, 216.13, 297/216.14, 452.41, DIG. 3, 452.58; 280/730.1, 730.2, 730 R, 730 A

[56] References Cited

U.S. PATENT DOCUMENTS

| | | | |
|---|---|---|---|
| 3,606,377 | 9/1971 | Martin | 297/216.13 X |
| 3,623,768 | 11/1971 | Capener et al. | 280/730.2 X |
| 3,752,533 | 8/1973 | Gilbert | 297/452.63 X |
| 4,711,495 | 12/1987 | Magder | 297/452.52 |
| 5,112,079 | 5/1992 | Haland et al. | 280/730.2 |
| 5,464,246 | 11/1995 | Castro et al. | 297/216.1 X |
| 5,503,428 | 4/1996 | Awotwi et al. | 297/216.13 X |
| 5,547,214 | 8/1996 | Zimmerman, II et al. | 280/730.2 X |
| 5,588,671 | 12/1996 | Boumarafi et al. | 280/730.2 |
| 5,601,332 | 2/1997 | Schultz et al. | 297/216.13 |

FOREIGN PATENT DOCUMENTS 523704  1/1993  European Pat. Off. ........... 280/730 A

*Primary Examiner*—Milton Nelson, Jr.
*Attorney, Agent, or Firm*—George W. Rauchfuss, Jr.; Gerald K. White

[57] ABSTRACT

A relatively rigid plastic sheet is molded into the foam seat pad of a motor vehicle seat where it forms part of the exterior surface of the pad. The sheet defines an airbag opening which communicates with a side-impact airbag module adjacent the pad and is positioned against an upholstery seam at a desired location on the seat. Upon actuation, the inflating bag is guided to and through the airbag opening so that the inflated bag is precisely located to provide maximum protection.

9 Claims, 1 Drawing Sheet

AIRBAG DEPLOYMENT PAD

TECHNICAL FIELD

This invention relates to vehicular airbags. More particularly, it pertains to side impact airbags which are housed in the internal structure of a vehicle seat.

BACKGROUND ART

It is known to surround, or otherwise enclose, side impact airbag modules by foam seat cushions. In such installations it is often desired that the airbag burst through an upholstery seam at a specific location to provide maximum protection. It is critical that the expanding airbag emerge in this precise location because of the short distance between the seat occupant and the adjacent door, window, or interior trim and the resulting short time interval within which to provide protection.

Accordingly, it is a primary object of the present invention to provide an automotive seat pad having a molded-in airbag travel-controlling sheet defining an airbag opening for providing airbag deployment consistency at a predetermined location through the seat back foam and trim. Such deployment consistency at a predetermined location allows for more robust deployment characteristics for side-impact airbags. Other objects, features, and advantages will become apparent from the following description and appended claims.

DISCLOSURE OF INVENTION

The invention comprises a molded foamed plastic pad having molded therein a plastic sheet which is relatively rigid as compared to the foam. This forms a stiffened portion on the external surface of the pad which defines an airbag opening adjacent the desired exit opening of an upholstery seam in the automotive seat.

BEST MODE FOR CARRYING OUT THE INVENTION

Figure 1:
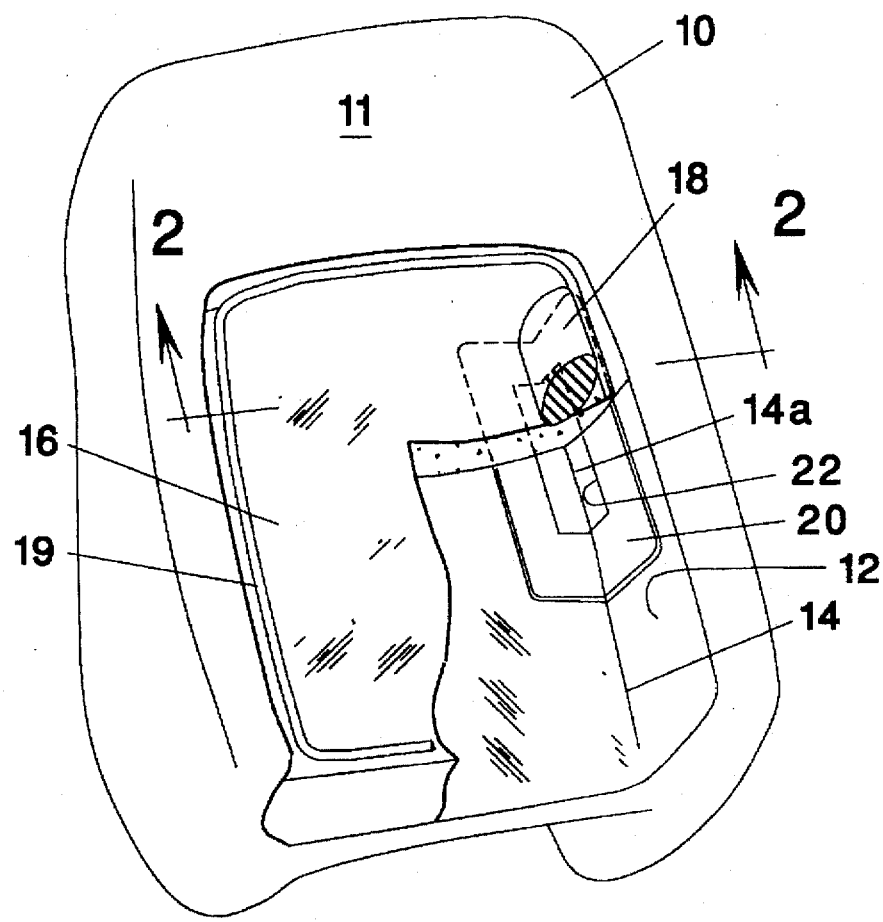
FIG. 1 a perspective view, partially broken away, of a vehicle seat back incorporating a foamed pad in accordance with the invention.

FIG. 1 illustrates a portion of an automotive seat comprising a seat body 10 as viewed from the rear and below. The seat body defines a substantially rectangular recess 12. Covering the seat body 10 is seat cover upholstery material 11 which is conjoined along a sewn seam 14. It is desired that a particular portion 14a of seam 14 should be rupturable so as to burst to release an airbag upon inflation.

Figure 2:
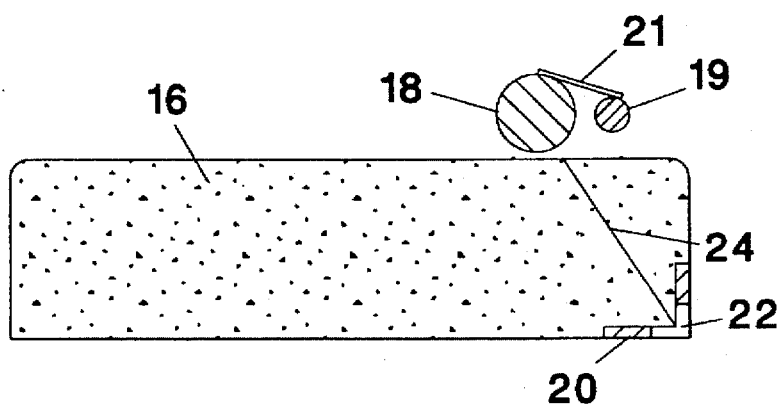
FIG. 2 is an enlarged cross-section of the pad taken substantially along the line 2—2 of FIG. 1.

Housed within the recess 12 of seat body 10 is a substantially rectangular plastic foam pad 16. As illustrated in FIG. 2, the pad 16 is thinner than the depth of recess 12, leaving a space enclosed by the recess. This space, in a completed seat, will be closed by a shell (not shown) forming the rear of the seat back. Enclosed within this space is a side-impact airbag module 18 housing an inflatable airbag, which module is illustrated as attached to a metal bar 19 by a welded metal strip 21. The bar 19 forms a part of the internal structural framework of the seat and merely serves to illustrate one possible method and location for installing the airbag module. It will also be understood that the module is conventional and, accordingly, is only schematically illustrated. Molded in place on an outer surface of the pad 16 is a sheet 20 which is relatively more rigid and stiffer than the pad 16 and which, in the illustrated version, is substantially L-shaped in cross-section and defines a central airbag opening 22 which overlies the airbag opening portion 14a of seam 14. In addition, the body of foam pad 16 includes a slit or perforation 24 which leads from the airbag module 18 to the opening 22 to thereby guide the airbag to the proper location along the seam 14.

It is to be understood that FIG. 2 is schematic in nature and not to scale. In actuality, the sheet 20 is much thinner than illustrated. In one actual embodiment, the sheet had a thickness of about 1–2 mm. Its size, as laid flat, was approximately 50 cm×30 cm and the airbag opening was approximately 8 cm×25 cm. However, it will be understood that the actual dimensions will vary and are determined by such factors as the thickness of the seat pad, the size of the airbag, etc. The relatively rigid plastic sheet 20 molded to the outer surface of the foam pad 16 acts to reinforce the foam pad in the area of the foam pad covered by the plastic sheet. The plastic sheet will preferably have a tensile strength, both in and against the machine direction, of about 300N (67.4 lbs) and a tear strength of about 200N (44.6 lbs).

Sheet 20 is preferably formed from any suitable plastic fibers which may be knitted, woven, or matted in a nonwoven web. This sheet is placed in the mold prior to introducing the foaming ingredients into the mold. An example of a material usable for the sheet 20 is a needled, nonwoven, spun bonded polypropylene mesh sold by Acme Mills Company of Santa Teresa, NM under the trademark TYPAR™. The molding of the reinforcing plastic sheet material, such as a TYPAR™ polypropylene mesh sheet, with an opening 22 therein into a foamed back pad can be accomplished by known insert molding technology which need not be further described.

It will now be apparent that, upon actuation of the airbag module, the expanding airbag will proceed through the perforation or slit 24, forcing apart the foam on either side and will proceed out through the opening 22, rupturing seam portion 14a and deploying into the space to be protected alongside the occupant of the seat. The relative rigidity of the sheet 20 reinforces the foam pad and insures that the airbag will not burst out of the soft foam at a location displaced from the region defined by the opening 22.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. In an automotive seat having a seat body covered with upholstery joined at a seam and a resilient foam pad housed in said seat body adjacent an airbag module, said seam having a rupturable seam portion for permitting deployment of an airbag from said module, the improvement which comprises:

a sheet which is relatively more rigid than said foam pad molded onto an outer surface of said foam pad forming a portion of the foam pad's external surface, said relatively rigid sheet defining an airbag opening adjacent said rupturable seam portion to guide therethrough an expanding airbag from said module.

2. An automotive seat of claim 1 wherein said sheet is L-shaped in cross section to form a corner edge of said foam pad.

3. An automotive seat of claim 2 wherein said sheet is plastic.

4. An automotive seat of claim 3 wherein said sheet comprises plastic fibers.

5. An automotive seat of claim 4 wherein said fibers comprise woven fibers.

6. An automotive seat of claim 4 wherein said fibers comprise knitted fibers.

7. An automotive seat of claim 4 wherein said fibers comprise a non-woven web.

8. An automotive seat of claim 3 wherein said sheet comprises a non-woven, spun bonded, polypropylene fiber mesh.

9. An automotive seat of claim 1 wherein said foam pad is perforated, forming an airbag deployment passage from said module to said airbag opening.

* * * * *